United States Patent [19]

Fujita

[11] Patent Number: 4,494,464

[45] Date of Patent: Jan. 22, 1985

[54] CASTOR WHEEL CARRIAGE

[76] Inventor: Kazuo Fujita, 2971-650, Hishino, Oaza, Seto-shi, Aichi-ken, Japan

[21] Appl. No.: 311,020

[22] Filed: Oct. 13, 1981

[51] Int. Cl.$^3$ .............. B60P 17/02; B61F 3/16; B61F 5/38; B61T 9/00

[52] U.S. Cl. ............... 105/170; 16/47; 104/1 A; 105/179; 105/215 R; 105/215 C; 295/1; 295/8.5; 295/33

[58] Field of Search .............. 104/1 A; 105/142, 170, 105/179, 180, 181, 215 R, 163 R, 215 A; 295/1, 8.5, 33; 16/47; 267/19

[56]  References Cited

U.S. PATENT DOCUMENTS

| | | | |
|---|---|---|---|
| 42,832 | 5/1864 | Brady | 295/33 |
| 128,533 | 7/1872 | Camacho | 105/215 R X |
| 267,425 | 11/1882 | Hayes | 295/1 |
| 350,263 | 10/1886 | Menzies | 105/170 X |
| 963,304 | 7/1910 | MacFarren | 295/33 |
| 1,280,238 | 10/1918 | King et al. | 105/163 |
| 1,431,248 | 10/1922 | Norris | 105/170 X |
| 2,123,707 | 7/1938 | Bloch | 267/19 X |
| 2,541,514 | 2/1951 | Herold | 295/8.5 |
| 2,657,947 | 11/1953 | Kerner | 295/8.5 |
| 2,787,970 | 4/1957 | Bennett | 105/142 X |
| 3,827,369 | 8/1974 | Mueller | 104/1 A X |

FOREIGN PATENT DOCUMENTS 525926  9/1940  United Kingdom ............... 295/8.5

Primary Examiner—Howard Beltran
Attorney, Agent, or Firm—Fleit, Jacobson, Cohn & Price

[57]  ABSTRACT

A wheeled carriage is proposed which is capable of moving on rails to-and-fro, and of moving on a railless flat floor in any desired direction. The carriage has at least three pivotable wheel units. Each of these units consists of a first wheel and a second wheel. The first wheel comprises a core wheel portion and a raised peripheral wheel portion surrounding the latter. The second wheel resembles substantially the core wheel portion of the first wheel. The wheel unit is designed for making two contact points with rails when seen at its side view and equally two contact points with rails when seen at its front or rear view.

2 Claims, 4 Drawing Figures

CASTOR WHEEL CARRIAGE

BACKGROUND OF THE INVENTION

This invention relates to improvements in and relating to wheeled carriages. More specifically, it relates to novel semi-bogie-type wheel units carrying the carriage.

In the prior art, such a carriage is already known which is provided with several non-bogied pairs of metal wheels, each comprising tapered side portions adapted for establishing rolling point contact with inside upper edge corners of a pair of specifically designed rails having a rectangular or inverted channel cross-section, a flat central portion being however provided between the both tapered side portions and fitted rigidly with a raised solid rubber ring tire, so as to be rollable on a flat railless floor. Although it is convenient to support each wheel of the two wheel units of front, intermediate and rear wheel units by a separate and independent axle. However, if desired, each lateral two pairs of the wheel units may be supported by a single and common axle. It should be noted that the term "front", "intermediate" or "rear" is used only for convenience of description, because the carriage is runnable to-and-fro on the rails as well as the railless floor.

This kind of carriage, which has four contact point type wheel treads when seen in one lateral axle line, on line is usable for various purposes. As an example, a staged lecture hall can be utilized as a sports- or amusement one, when all the chairs and the like movable attributes have been carried into an idle space below the stage, so as to leave in the hall a broad unobstructed flat floor.

For this purpose, a number of parallel rail pairs are laid below the stage and the same number of the above kind of carriages are provided for carrying away the chairs and the like thereon and into the under-stage, otherwise idle space, together with the carriages. On the railless floor, these carriages run with the rubber tyres. For reuse of the hall for lecture service, the carriages are manually drawn out together with the loaded chairs onto the railless floor, for unloading and resetting them on the floor again. These chairs are also of the collapsible type.

In this wheeled carriage, all the wheels are so-to-speak journalled, although normally antifriction bearings are provided between the wheel and its axle, and thus these wheels are not polstered of swivelled relative to the carriage proper. Therefore, the carriage can run only on a straight line. However, it would be highly convenient if the carriage can run laterally on the railless floor.

SUMMARY OF THE INVENTION

It is an object of the present invention to realize such an improved carriage which can easily run laterally on the railless floor.

If such to-and-fro runnable carriage as above described be provided with holstered wheels, the return movement thereof on rails would be practically unable, because in this case the holstered wheels will be subject to a 180 deg.-turning movement and liable to disengage from the mating rails.

According to this invention, a semi-bogied twin wheel combination commonly pivoted to the bottom of the carrier is proposed for avoiding otherwise possible heavy friction loss with the cooperating rails and liable disengagement of the wheels from the latter to be encountered in the return running service.

This and further objects, features and advantages of the invention will become more apparent as the description goes on in connection with the accompanying drawings, in which:

DETAILED DESCRIPTION OF THE INVENTION

Figure 1:
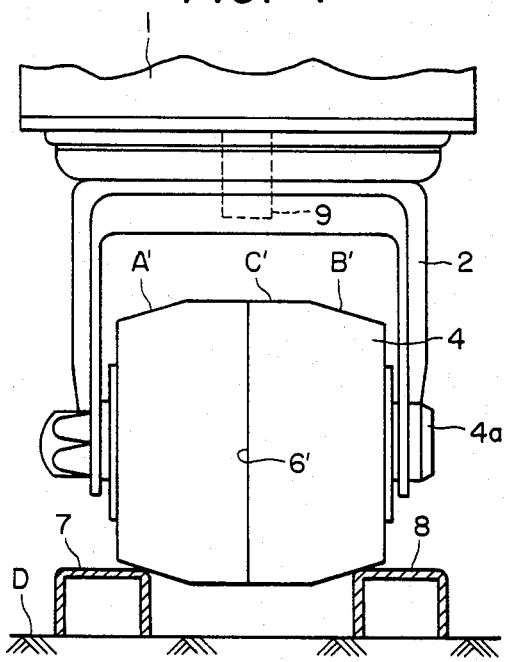
FIG. 1 is an end view showing the smaller wheel of a twin-wheel unit as seen from the right hand side thereof in FIG. 2.

Referring now to the embodiments shown in the drawings, FIGS. 1–3, the invention will be described more in detail.

In these drawings, numeral 1 represents only a part of a wheeled vehicle, chassis or carriage, having a pivotable castor support 2 which is pivotally mounted on the vehicle at 9. This support 2 has twin arms 2a and 2b when seen at its side view shown in FIG. 2, carrying rotatably a first wheel 3 and a second wheel 4 supported for this purpose by respective wheel shafts 3a and 4a, respectively. Between these shafts and respective wheels, there are provided naturally bearing means, preferably of the antifriction type, as at 5 in FIG. 3.

The first wheel 3 comprises a solid main or core wheel portion 3b, made of steel or the like rigid material, an elastic ring wheel portion 3c, preferably made of natural or synthetic rubber, being fixedly and centrally attached around the periphery of the core wheel portion by the conventional baking, vulcanizing, cementing or adhering technique.

The core wheel portion comprises two cup-shaped halves which are joined together by welding. Numeral 6 shows such seam or welded line. However, if necessary, the core wheel may be of the solid and rigid one piece structure made of cast iron, cast steel, forge steel or the like.

The outline configuration of core wheel 3b represents a central flat C and side inclined tapers A and B. The ring wheel 3c is mounted on the central flat as shown.

If necessary, however, the ring wheel portion is made of iron or steel and integral with the core wheel.

As may be well supposed, the second wheel 4 has substantially same outline and structure with those of said core wheel 3b. In this case, the outer ring wheel portion has been dispensed with. The central flat if shown with C' while the side inclined tapers are represented with A' and B'.

Numerals 7 and 8 represent a pair of parallel rails of a specific design. In the embodiment shown, the rail has a hollow rectangular cross-section. If necessary, however, the rail may be rigid instead of hollow. Further, it may be of the channel section opening towards upper.

Figure 4:
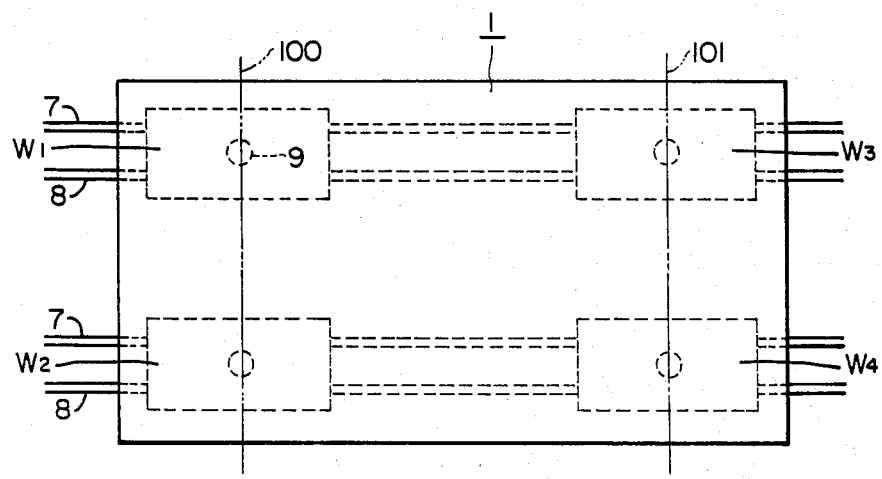
FIG. 4 is a schematic plan view of a wheeled carriage, provided with four twin-wheel units.

As shown schematically in FIG. 4, one carriage 1 is provided with two front and two rear twin-wheel units W1; W2; W3 and W4. The front wheel units W1 and W2 are arranged along lateral imaginary line 100. In the similar way, the rear wheel units W3 and W4 are arranged along lateral imaginary line 101. Naturally, these two lines 100 and 101 are parallel with each other. Each wheel unit comprises the first wheel 3 and the second wheel 4. When seen, however, in the lengthwise direction of the carriage 1, the first wheel is situated always in the outer position relative to the second wheel.

As seen from the drawings, each of the wheel units, W1, W2, W3 and W4, shows two contact points with the rails. Thus, when seen along the lateral line 100 or 101, there are four contact points between the wheels and the rails. Naturally, there are four rails per carriage. It should be noted, however, the term "contact point" is used only in the theoretical meaning. However, in practice, these point contacts are realized as far as possible. This wheel-rail relationship is naturally far remote from the conventional traffic one in which the contact is of the line contact mode in contrast to the point contacts adopted in the present invention. By the adoption of this four-point contact principle in line, the desired optimal automatic self-centering function for the wheels can be positively assured when the carriage runs on the double twin-rail arrangement as shown in FIG. 4.

Figure 2:
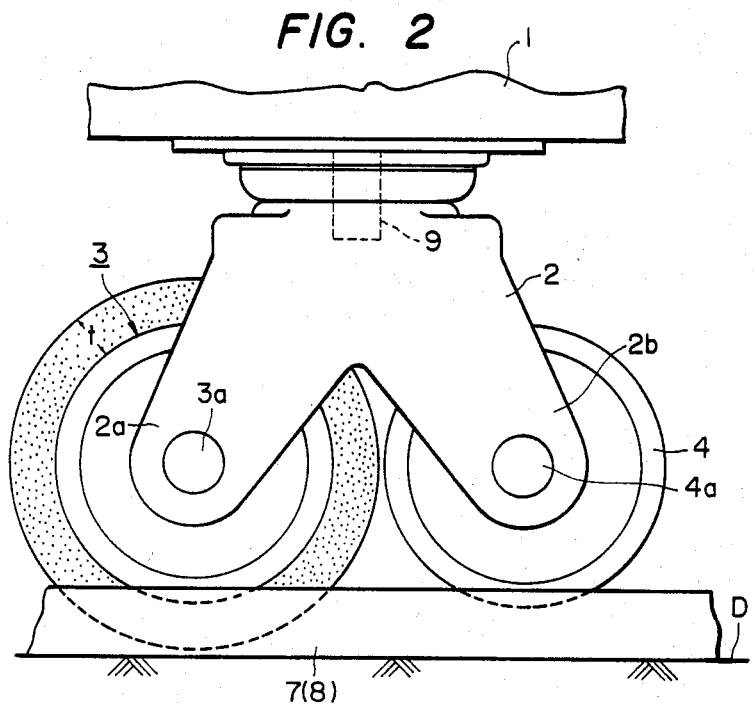
FIG. 2 is a side view of the twin-wheel unit.
Figure 3:
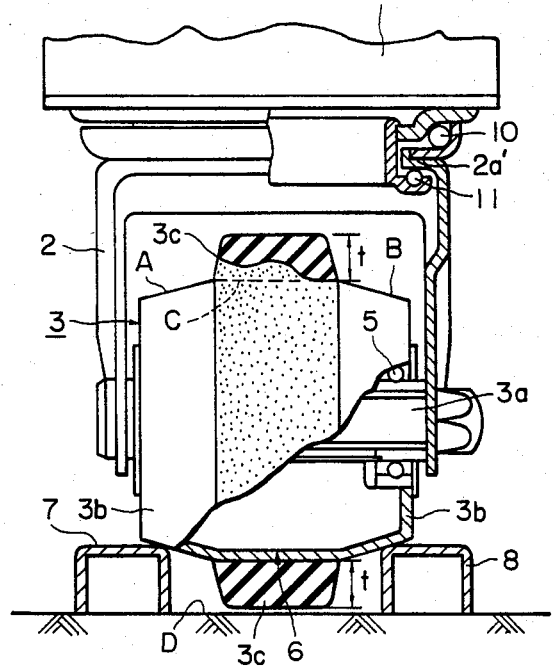
FIG. 3 is an end view of a modified embodiment partially sectioned.

In the modified embodiment shown, the upper end 2a' of wheel support 2 is rotatably supporting the carriage 1 by means of two mutually overlapped swivel or thrust bearings 10; 11 for the same swivelling purpose as at 9 in FIGS. 1 and 2.

Although in FIG. 2, the wheel support 2 is shown in the downwardly opening, two arm style, but this specific configuration is not limitable. The support 2 may have any other suitable side configuration such as a rectangular plate, channel yoke, or trapezoidal box or channel shape, if necessary.

The raised thickness dimension, t, of outer central elastic or rigid ring wheel portion 3c is so selected that when the carriage run on the railless flat floor D, the second wheel 4 does not touch the floor surface. On the contrary, when the carriage runs on the rails, the first and second wheels will contact the rail edges. As shown in FIG. 2, the outer ring wheel portion 3c is kept separated completely from the rail edges, as may be most clearly seen from FIG. 3.

By virtue of the twin wheel contact with each rail when seen at the side view of the twin wheel unit W1, W2, W3 or W4 as is the case of FIG. 2 where the carriage travels on rails, each of the wheel units can not execute practically any swivel movement relative to the rails.

On the contrary, when the carriage is pushed forward or drawn rearward, and its first wheels only serve for running by means of the centrally raised outer ring portion 3c, the wheel units W1, W2, W3 and W4 can swivel substantially simultaneously to any desired direction by receiving occasional and specific manual physical effort by the operator other than direct forward or rearward direction. It may therefore be supposed that the carriage can run on the flat floor D in any desired direction as occasion may desire. Thus, it can move even in the quite lateral direction.

In a modified arrangement, although not shown, the carriage may have two front wheel units W1 and W2 and only one wheel unit such as W3 as the rear side supporting wheel means. In this modification, and if desired, the single wheel unit may be of non-pivotable type.

As for the one wheel unit or rails, the contact points are four in total with the rails. On the contrary, each wheel unit will establish only one contact line with the flat floor when the carriage runs on the railless flat floor.

If one wheel unit is used in place of the two wheel units, a pair of auxiliary rails must naturally be provided centrally between the existing two sets of rails and in parallel thereto.

If necessary, the second wheel may consist of a ball type wheel.

It should be noted that the term paper in this specification may consist of a convexedly curved surface.

The embodiments of the invention in which an exclusive property or privilege is claimed are as follows:

1. The combination of a carriage and a castor wheel assembly wherein said castor wheel assembly is pivotally supportably mounted on said carriage, said castor wheel assembly being adapted to be mounted on at least one of a floor and a pair of twin rails, said castor wheel assembly comprises a first wheel having inclined wheel portions at the edges of its periphery for engaging a pair of twin rails and a raised wheel portion defined by the periphery of the first wheel between the inclined wheel portions for engaging a floor when said wheel is dismounted from the pair of twin rails, said raised wheel portion being radially outwardly projected from said inclined wheel portions; and a second wheel having inclined wheel portions at the edges of its periphery for engaging the twin rails and said second wheel acting as a guide for said first wheel by engaging said twin rails for stabilized movement of said first wheel on said twin rails.

2. The combination as claimed in claim 1, wherein said first wheel and said second wheel each include a central flat peripheral portion with said inclined wheel portions positioned on each side of said central flat peripheral portion.

* * * * *